(12) United States Patent
Frett (10) Patent No.: US 9,548,915 B2
(45) Date of Patent: Jan. 17, 2017

(54) METHODS AND APPARATUS TO DETERMINE AN END TIME OF STREAMING MEDIA

(71) Applicant: The Nielsen Company (US), LLC, Schaumburg, IL (US)

(72) Inventor: Kenneth Joseph Frett, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 177 days.

(21) Appl. No.: 14/448,764

(22) Filed: Jul. 31, 2014

(65) Prior Publication Data

US 2016/0036880 A1 Feb. 4, 2016

(51) Int. Cl.
*G06F 15/173* (2006.01)
*H04L 12/26* (2006.01)
*H04L 29/06* (2006.01)

(52) U.S. Cl.
CPC ....... *H04L 43/0882* (2013.01); *H04L 43/0894* (2013.01); *H04L 65/80* (2013.01)

(58) Field of Classification Search
CPC ... H04L 43/0882; H04L 65/80; H04L 43/0894
See application file for complete search history.

(56) References Cited

U.S. PATENT DOCUMENTS

| | | | |
|---|---|---|---|
| 6,138,163 A * | 10/2000 | Nam | H04L 29/06027 348/E5.008 |
| 6,141,053 A | 10/2000 | Saukkonen | |
| 6,292,834 B1 | 9/2001 | Ravi et al. | |
| 6,309,424 B1 | 10/2001 | Fallon | |
| 6,314,466 B1 | 11/2001 | Agarwal et al. | |
| 6,633,918 B2 | 10/2003 | Agarwal et al. | |
| 6,772,217 B1 * | 8/2004 | Baumann | H04L 47/10 370/395.41 |
| 7,284,065 B2 | 10/2007 | Agarwal et al. | |
| 7,373,415 B1 | 5/2008 | DeShan et al. | |
| 7,382,796 B2 | 6/2008 | Haberman et al. | |
| 7,817,557 B2 | 10/2010 | Woodworth | |
| 8,107,375 B1 | 1/2012 | Wong et al. | |
| 8,160,603 B1 | 4/2012 | Bertz et al. | |
| 8,356,108 B2 | 1/2013 | Agarwal et al. | |
| 8,792,382 B2 | 7/2014 | Bugenhagen | |
| 8,959,244 B2 * | 2/2015 | Lin | G06Q 30/0241 709/231 |
| 2003/0067872 A1 | 4/2003 | Harrell et al. | |

(Continued)

OTHER PUBLICATIONS

Xu et al., "Analysis of Buffer Starvation with Application to Objective QoE Optimization of Streaming Services," arXiv:1108.0187v4, Aug. 6, 2013 (15 pages).

Fang, Chunsheng, "Gaussian Mixture Model background modeling for video Manual version 1.0," Sep. 3, 2008, retrieved from www.academia.edu/949421/Gaussian_Mixture_Model_background_modeling_for_video_Manual_version_1.0, (3 pages).

(Continued)

*Primary Examiner* — Mohamed Wasel
(74) *Attorney, Agent, or Firm* — Hanley, Flight & Zimmerman, LLC (57) ABSTRACT

An example method includes analyzing bandwidth usage data corresponding to bandwidth usage associated with streaming media. The example method also includes determining a size of a buffer based on the bandwidth usage data. The example method further includes determining an end time of the media based on the size of the buffer. In some examples, the end time occurs a period of time after downloading of data associated with the media is completed.

27 Claims, 5 Drawing Sheets

(56) References Cited

U.S. PATENT DOCUMENTS

| | | | |
|---|---|---|---|
| 2003/0236902 A1* | 12/2003 | Weiss | H04L 12/5695 709/231 |
| 2004/0146006 A1 | 7/2004 | Jackson | |
| 2005/0120113 A1* | 6/2005 | Bunch | H04L 43/06 709/224 |
| 2005/0223089 A1 | 10/2005 | Rhodes | |
| 2007/0116137 A1* | 5/2007 | McCoy | H04L 27/2605 375/260 |
| 2009/0260045 A1 | 10/2009 | Karlsson et al. | |
| 2009/0262136 A1* | 10/2009 | Tischer | G06T 1/00 345/629 |
| 2009/0313330 A1 | 12/2009 | Sakamoto | |
| 2011/0078324 A1 | 3/2011 | Honma et al. | |
| 2013/0005296 A1 | 1/2013 | Papakostas et al. | |
| 2013/0117463 A1 | 5/2013 | Agarwal et al. | |
| 2013/0155882 A1* | 6/2013 | Pendleton | H04L 43/0882 370/252 |
| 2013/0159494 A1 | 6/2013 | Danda et al. | |
| 2013/0219446 A1 | 8/2013 | Hefeeda et al. | |
| 2013/0326024 A1* | 12/2013 | Chen | H04L 65/4084 709/219 |
| 2014/0012953 A1* | 1/2014 | Stoyanov | H04N 21/23406 709/219 |
| 2014/0068652 A1 | 3/2014 | Mountanos et al. | |
| 2014/0157305 A1 | 6/2014 | Del Sordo et al. | |
| 2014/0169192 A1 | 6/2014 | Zhang et al. | |
| 2016/0065441 A1* | 3/2016 | Besehanic | H04L 43/0894 709/224 |

OTHER PUBLICATIONS

Eun et al., "Performance Modeling of TCP/AQM with Generalized AIMD under Intermediate Buffer Sizes," Performance, Computing, and Communications Conference, 2006. IPCCC 2006. 25th IEEE International, Apr. 10-12, 2006 (20 pages).

The Nielsen Company (US), LLC, "Methods and Apparatus to Predict End of Streaming Media Using a Prediction Model," filed with the United States Patent and Trademark Office on Aug. 29, 2014, U.S. Appl. No. 14/473,602 (48 pages).

International Searching Authority, "Search Report", issued in connection with PCT patent application No. PCT/US2014/068075, mailed on May 15, 2015, 5 pages.

International Searching Authority, "Written Opinion", issued in connection with PCT patent application No. PCT/US2014/068075, mailed on May 15, 2015, 6 pages.

International Searching Authority, "International Search Report," issued in connection with International Application No. PCT/US2015/042619, on Feb. 19, 2016 (3 pages).

International Searching Authority, "Written Opinion," issued in connection with International Application No. PCT/US2015/042619, on Feb. 19, 2016 (5 pages).

United States Patent and Trademark Office, "Non-Final Office Action," issued in connection with U.S. Appl. No. 14/473,602, on May 5, 2016, 16 pages.

United States Patent and Trademark Office, "Final Office Action," issued in connection with U.S. Appl. No. 14/473,602, dated Nov. 4, 2016, 34 pages.

\* cited by examiner

METHODS AND APPARATUS TO DETERMINE AN END TIME OF STREAMING MEDIA

FIELD OF THE DISCLOSURE

This disclosure relates generally to measuring media exposure, and, more particularly, to methods and apparatus to determine an end time of streaming media.

BACKGROUND

Internet access to media has become widespread. Media is now frequently streamed to consumers via streaming services such as, Netflix™, Hulu™, Amazon™, and others. Streaming enables media to be delivered to, and presented by, a wide variety of media presentation devices, such as smart TVs, desktop computers, laptop computers, tablet computers, personal digital assistants, smartphones, gaming consoles, etc. A significant portion of media (e.g., content and/or advertisements) is presented via streaming to such devices.

DETAILED DESCRIPTION

The use of media devices (e.g., smartphones, tablets, MP3 players, personal computers, gaming consoles, etc.) to present streaming media available via the Internet has increased in recent years. As different types of media applications (e.g., a Netflix™ application, a Hulu™ application, a Pandora™ application, etc.) for such media devices have been created, the popularity of streaming media has increased. Indeed, some households have eliminated traditional sources of media (e.g., satellite television, cable television) in favor of such streaming devices. In view of the increasing popularity of accessing media in this manner (e.g., via the Internet), understanding how users interact with streaming media (e.g., such as by understanding what media is presented, how the media is presented, when the media is presented, who is accessing such media, etc.) provides valuable information to service providers, advertisers, media (e.g., content or advertisement) providers, manufacturers, and/or other entities.

Some techniques to identify media include the detection of watermarks in the media and/or signatures from the media. Audio watermarking is a technique used to identify media such as television broadcasts, radio broadcasts, advertisements (television and/or radio), downloaded media, streaming media, prepackaged media, etc. Existing audio watermarking techniques identify media by embedding audio codes (e.g., a watermark), such as media identifying information and/or an identifier that may be mapped to media identifying information, into an audio and/or video component having a signal characteristic sufficient to hide the watermark. As used herein, the terms "code" or "watermark" are used interchangeably and are defined to mean any identification information (e.g., an identifier) that may be transmitted with, inserted, and/or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and compared to reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are hereby defined herein to mean a proxy that may be used for identifying media by comparison with a reference database and that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

In addition to enabling the identification of particular media presentations, watermarks and/or signatures may also provide information (e.g., via associated timestamps) regarding the timing of the presentation of the media including the beginning time, the duration, and/or the end time. In some situations, streaming media may not include watermarks (e.g., if the media is encrypted) and/or may not have a signature that is indexed in a reference database. In such settings, specifically identifying the media based on codes/ watermarks and/or signatures may not be possible.

In such circumstances, to obtain at least some information regarding the timing of an audience's exposure to streaming media, the amount of data downloaded by a media presentation device over time may be monitored to identify times when the data is associated with streaming media. For example, streaming media is often associated with large amounts of data such that streaming media requires a high bandwidth (relative to other online activities) to provide smooth playback of the media. Thus, a relatively large increase in bandwidth usage at a certain point in time may be indicative of the beginning of a streaming media presentations while the bandwidth demand decreasing down to zero or some nominal baseline value may be indicative of an ending of the streaming media presentation.

However, to improve the playback of streaming media, such media is typically buffered. A buffer is a section of memory in a media presentation device playing or preparing to play the media (or other associated device) that stores future portions of the media being streamed (either before the media begins playing or while previously stored portions of the media are played). That is, when a media device is streaming media, the device downloads a portion of the media presentation to a buffer and then begins playing the downloaded portion from the buffer while continuing to download subsequent portions of the media presentation. This process may continue until the audience terminates the media presentation and/or until the entire presentation has been downloaded. Once the entire presentation has been downloaded there will still be a period of time during which the last buffered portions of the media presentation are played back to an audience of the media device. As a result, the timing of a decrease in bandwidth usage is not necessarily indicative of an end time of the media but merely the time when the last portion of media data associated with the media presentation has been downloaded to the buffer. The actually end time of the streaming media in such circumstances may be some point in time after media data stops buffering when the buffer is finally emptied and the media data is played back. Accordingly, there is no direct way to accurately determine the end time of streaming media based on the rise and fall of bandwidth demand associated with the media.

Examples disclosed herein overcome this problem to more accurately determine the end time of streaming media based on bandwidth usage data. In some examples, the teachings disclosed herein are implemented when other media monitoring techniques (e.g., watermarks and/or signatures) are unavailable. In other examples, the teachings disclosed herein are implemented in combination with other media monitoring techniques as a secondary or redundant measurement of the timing of streaming media. Information regarding the timing of streaming media (even if without specific media identifying information) is desirable to determine the viewing habits and/or behavior of audience members. For example, while media presentations may not be identifiable with specificity, determining the timing of streaming such media provides insights into how much media people are exposed to and when they are exposed to media as opposed to engaging in other activities.

In some examples disclosed herein, the timing of streaming media is determined by monitoring bandwidth usage associated with the streaming of a media presentation. Bandwidth usage is a measurement of the rate of data transfer or bit-rate associated with data communications. That is, bandwidth usage is a measure of an amount of data transferred over a given period of time. Because the term "bandwidth" may refer to a maximum throughput or maximum capacity of a communication path (e.g., bandwidth capacity), as used herein, the terms "bandwidth usage" and/or "bandwidth demand" are expressly defined to refer to the actual data throughput or observed rate of data transfer through a communication path (e.g., bits per minute). In other words, whereas "bandwidth" refers to the capacity of a wired and/or wireless communication line, as used herein "bandwidth usage" and/or "bandwidth demand" refer to the actual amount of data transferred over time via a wired and/or wireless communication link. Such bandwidth usage/bandwidth demand is typically measured with respect to a particular streaming device being monitored, but could alternatively be measured at other points in a network (e.g., at a gateway or router of a panelist household). While such bandwidth demand can be expressed as the total amount of data transferred divided by the total time it takes to complete such a transfer, in some disclosed examples, the bandwidth demand is measured at discrete intervals of time. In this manner, the variation or change in bandwidth usage over time (e.g., while streaming media) can be identified. In some examples, the change in bandwidth usage over time is used to calculate the end time of the media. The granularity of the time intervals may be any suitable length (e.g., 1 second, 100 milliseconds, etc.) with smaller intervals providing a more accurate indication of the variation in the bandwidth usage but at the cost of generating more data requiring more processing power to analyze.

Figure 1:
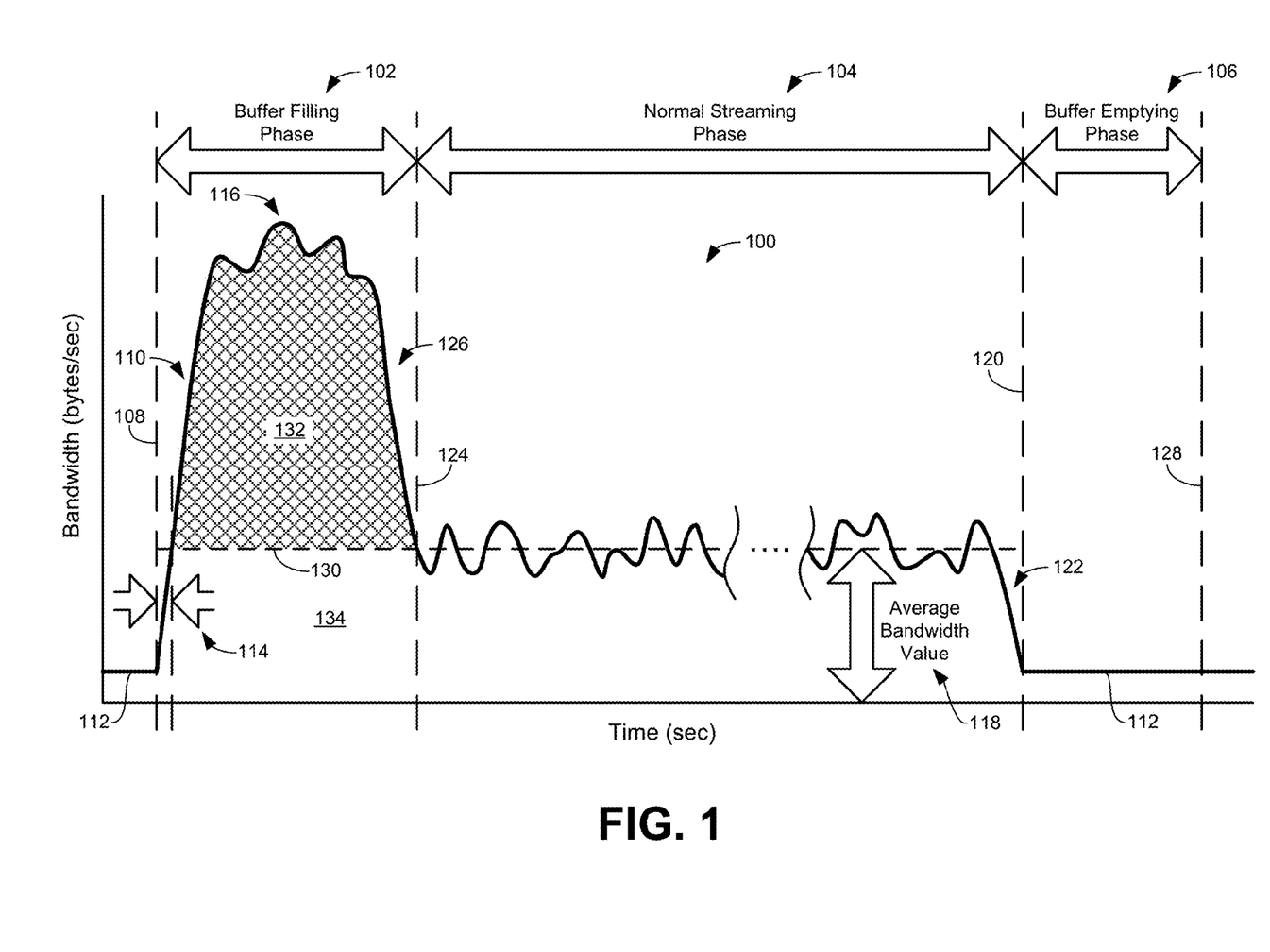
FIG. 1 is an example bandwidth usage curve associated with streaming media divided into phases in accordance with the teachings disclosed herein.

Frequently, the bandwidth demand associated with the streaming of media through a buffer can be divided into three general phases during the playing of a particular media presentation as represented in the example bandwidth usage curve 100 of FIG. 1. The example bandwidth usage curve of FIG. 1 illustrates the change in bandwidth usage over time during the streaming of a media presentation. As illustrated in FIG. 1, the three phases include a buffer filling phase 102, a normal streaming phase 104, and a buffer emptying phase 106. In the example of FIG. 1, the buffer filling phase 102 corresponds to an initial period of time from a beginning or start time 108 of streaming of the media until the buffer is filled with a threshold amount of data. This initial period may depend on numerous factors such as the streaming device specifications (e.g., buffer size) and/or the network characteristics (e.g., bandwidth capacity). In some examples, the threshold amount of data approximately corresponds to a size of the buffer such that the buffer filling stage ends when the buffer is substantially full. However, the buffer may or may not be entirely filled to capacity during the buffer filling phase 102. In some examples, the start time 108 is identified based on a sudden rise 110 in the bandwidth usage above a baseline bandwidth usage 112 corresponding to a bandwidth usage when media is not being downloaded (e.g., before the start time 108 of the streaming media). In some examples, the baseline bandwidth usage 112 may be zero. However, in other examples, there may be data traffic unrelated to the streaming media such that the baseline bandwidth usage 112 is non-zero.

In some examples, playback commences prior to the end of the buffer filling phase 102. For instance, in the example of FIG. 1, the buffer filling phase 102 includes a pre-playback sub-phase 114 corresponding to the period of time when the first portion of data associated with the media is downloaded to the buffer before the media presentation begins playing. The pre-playback sub-phase 114 may be a relatively short period of time within the buffer filling phase 102. That is, once an initial threshold of data is stored in the buffer during the pre-playback phase 114, a media device (e.g., the media devices 204, 206 of FIG. 2) may begin playing the media while continuing to download more data to continue filling the buffer. In such examples, the buffer filling phase 102 extends beyond the pre-playback sub-phase 114. In such examples, the amount of data being downloaded during the buffer filling phase 102 is greater than the amount of data being emptied from the buffer as a result of the media being played. As noted above, the duration of the buffer filling phase 102 depends upon numerous factors including, the size of the buffer, the rate at which data is downloaded, and the rate at which the downloaded data is emptied from the buffer as the media is played back (e.g., after the pre-playback sub-phase 114).

The normal streaming phase 104 in the illustrated example of FIG. 1 corresponds to the period of time after the buffer is filled to the threshold (e.g., after the buffer filling phase 102) but while there is additional data to be downloaded (e.g., there is more media data to be buffered). Typically, the normal streaming phase 104 is the longest of the three phases 102, 104, 106 with a duration approximately corresponding to the length of the associated media presentation less the duration of the buffer filling phase 102 and the buffer emptying phase 106. However, in some examples, the duration of the normal streaming phase 104 may be shorter than the length of the associated media presentation if the audience terminates playback of the presentation before reaching the end. During the normal streaming phase 104 the buffered portions of the media are played via the media device and subsequent portions of the media are buffered to fill the portion of the buffer emptied by the previous portions of the media being played. Thus, the amount of data downloaded (buffered) to the buffer during the normal streaming phase 104 generally corresponds to the amount of data being emptied from the buffer due to the media playback. In this manner, the amount of data in the buffer is substantially maintained at the threshold level (e.g., full) at all times. By contrast, as noted above, the amount of data downloaded to the buffer during the buffer filling phase 102 corresponds to the amount of data being emptied from the buffer (after the pre-playback sub-phase 114) plus an additional amount of data to fill the buffer to the threshold amount. Because more data is being downloaded during the buffer filling phase 102 than is being emptied by playback, the bandwidth usage during the buffer filling phase 102 is higher than the bandwidth usage during the normal streaming phase 104. As shown in the illustrated example of FIG. 1, the bandwidth usage during the buffer filling phase 102 exhibits a relatively high peak 116 when compared with the relatively lower bandwidth usage during the normal streaming phase 104. In the example of FIG. 1, the normal streaming phase exhibits fluctuations about an average bandwidth usage value 118.

Although the bandwidth usage during the normal streaming phase 104 is lower than the bandwidth usage during the buffer filling phase 102, the bandwidth usage during the normal streaming phase 102 is still higher than the baseline bandwidth usage 112 (i.e., bandwidth usage when no streaming is occurring). In some examples, the average bandwidth usage value 118 corresponds to the average bandwidth usage throughout the normal streaming phase 104. Thus, in some examples, the average bandwidth usage value 118 depends on identifying a beginning and ending of the normal streaming phase 104. In the example of FIG. 1, the ending of the normal streaming phase 104 corresponds to a transition time 120 between the normal streaming phase 104 and the buffer emptying phase 106. In some examples, the transition time 120 is identified based on a drop 122 in bandwidth usage from a relatively higher bandwidth demand (e.g., near the average bandwidth usage value 118 while media data is being buffered) toward the lower baseline bandwidth usage value 112 (when media data is no longer being buffered).

In some examples, the drop 122 in the bandwidth usage at the transition time 120 is indicative of there being no more data to be downloaded (e.g., all data associated with the media presentation to the end of the presentation has already been downloaded). In other examples, the drop 122 may be indicative of an audience terminating further playback of the media presentation, for example, to skip the credits of the media. In some examples, audio monitoring to distinguish between an abrupt stop to the streaming of the media and passing through the transition time 120 into the buffer emptying phase. For example, while an audio monitoring system may not be able to identify a particular media presentation when the media does not include watermarks and/or does not have a signature that is indexed in a reference database as described above, the audio monitoring system can still detect whether there is sound. Accordingly, in some examples, if the drop 122 occurs substantially simultaneously with sound detected by the audio monitoring system becomes quiet or otherwise changes, then the time of the drop 122 may be identified as an ending of the media presentation (e.g., the time when the media presentation stopped). By contrast, in some examples, if the audio monitoring system continues to detect sound before and after the drop 122, the drop 122 may be identified as the transition time 120 as described above. Additionally or alternatively, in some examples, if the audio monitoring system begins detecting watermarks in detected sound beginning substantially at the time of the drop 122, the drop 122 may be identified as the ending of the streaming media presentation and the beginning of a different media presentation. In some such examples, there may not be a drop in the bandwidth usage because the new media presentation is also being streamed. However, in some such examples, the ending of the first media presentation and the beginning of the second streaming media is detected based on the time when the watermarks began to be detected.

In some examples, the beginning of the normal streaming phase 104 corresponds to a transition time 124 between the buffer filling phase 102 and the normal streaming phases 104. In some examples, the transition time 124 is identified based on a change (e.g., a drop 126) in the bandwidth usage curve 100 from the relatively high bandwidth usage values at the peak 116 towards the relatively lower average bandwidth usage value 118. The precise point of the transition time 124 may be determined using any suitable method based on an analysis of the characteristics of the bandwidth usage curve 100. For example, the transition time 124 may be determined to correspond to the point in time where the bandwidth usage curve 100 crosses a threshold at or near the average bandwidth usage value 118 (e.g., 126%, 116%, 100% (as illustrated), or 95% of the average usage value 118). In such examples, determining the precise point of the transition time 124, indicative of the beginning of the normal streaming phase 104, depends on a determination of the average bandwidth usage value 118. Determining the average bandwidth usage value 118 depends on a determination of the beginning (and ending) of the normal streaming phase 104. Accordingly, in some such examples, the determination of the average bandwidth usage value 118 and the transition time 124 is an iterative process. Notably, as shown in the illustrated example, both the buffer filling stage 102 and the normal streaming phase 104 exhibit variation and/or oscillation in bandwidth demand over time because the buffer is being simultaneously and/or iteratively emptied (as the media is played) and refilled (with data corresponding to future portions of the media). As such, in some examples the method of determining the transition time 124 (when the buffer contains the threshold amount of data (e.g., is completely full)) is an estimate that is not perfectly precise.

In the example of FIG. 1, the buffer emptying phase 106 corresponds to the period of time after all data associated with the particular media presentation has been buffered (e.g., corresponding to the end of the normal streaming phase 104 indicated by the transition time 120) until an end time 128 of the media presentation (corresponding to the actual ending of the media presentation being played via the media presentation device). As shown in the illustrated example, there is no bandwidth usage activity during the buffer emptying phase 106 (other than the baseline bandwidth usage 112) because the data associated with the media for the final portions or ending of the media has already been stored in the buffer during the normal streaming phase 104 such that no additional data is downloaded during the buffer emptying phase 106. In other words, the buffer emptying phase 106 is the time period in which the media device empties the remaining media data stored in the buffer by playing the media without a corresponding refilling of the buffer because there are no future portions of the media to be buffered. Thus, unlike the start time 108 and the transition times 120, 124 that can be identified based on changes in the bandwidth usage curve 100, there is no way to directly measure the end time 128 by monitoring changes in bandwidth usage. However, in examples disclosed herein, an estimate of the end time 128 may be formulated based on the bandwidth usage values measured during the buffer filling phase 102 and the normal streaming phase 104. Although, for clarity, the buffer empty phase 106 is shown with the no bandwidth usage (e.g., the baseline bandwidth usage 112 is shown as a flat line), the baseline bandwidth usage may be non-zero due to other Internet activity occurring at a household being monitored.

In some examples, the average bandwidth usage value 118 corresponding to the average bandwidth usage during the normal streaming phase 104 is used to separate the data downloaded during the buffer filling phase 102 into two portions. This is represented graphically in FIG. 1 with a line 130 drawn over the bandwidth usage curve 100 corresponding to the average bandwidth usage value 118. As shown in the illustrated example, the line 130 is extended back into the buffer filling phase 102 to demarcate a first portion 132 above the line 130 (shaded) and a second portion 134 below the line 130 (unshaded). In the illustrated example, the area under the curve 100 during the buffer filling phase 102 corresponds to the total amount of data downloaded during the phase. Thus, the area of the second portion 134 (associated with the bandwidth usage below the average bandwidth usage value 118) corresponds to an average amount of data that would be downloaded during the buffer filling phase 102 if the buffer was already full (e.g., as if the media was streaming during the normal streaming phase 104). Stated differently, the average amount of data represented by the area of the second portion 134 corresponds to the amount of data that was buffered and played back during the buffer filling phase 102. By contrast, the area of the first portion 132 (associated with the bandwidth usage in excess of the average bandwidth usage value 118) corresponds to the amount of data downloaded during the buffer filling phase 102 to fill the buffer to the threshold amount (apart from the data downloaded to replace data emptied from the buffer on account of the media being played). In other words, the area under the curve 100 and above the line 130 (e.g., the area of the shaded portion 132) is a measure of the size of the buffer. That is, the amount of data represented by the shaded area (portion 132) corresponds to an amount of data accumulated in the buffer whereas the amount of data represented by the unshaded area (portion 134) corresponds to an amount of data passed through the buffer (e.g., downloaded and subsequently played back).

In some examples, the area of the shaded portion 132 is calculated by subtracting the average bandwidth usage value 118 from the measured bandwidth usage for a particular time interval, multiplying the difference by the time interval, and then summing the resulting values for each time interval during the buffer filling phase 102. In other words, the area of the shaded portion 132 (indicative of the size of the buffer) may be calculated by performing a Riemann sum on the bandwidth usage data associated with the buffer filling phase 102. However, the representation of the bandwidth usage over time in the curve 100 and the area under the curve is for purposes of explanation only. The generation of an actual curve and/or the calculation of an associated area are not necessary for the implementation of the teachings disclosed herein. Rather, as described above, the bandwidth usage as used herein refers to the actual amount of data transferred over time, which may be expressed over a series of small time intervals. However, in some examples, the total amount of data downloaded during the entire buffer filling phase 102 (graphically represented as the area under the bandwidth usage curve 100 during the buffer filling phase 102) is the same as the sum of all the data downloaded during each time interval over the same period. Thus, in some examples, the total amount of data downloaded during the buffer filling phase 102 is directly measured without any complex calculations or summations. In some such examples, the size of the buffer (graphically represented as the area of the shaded portion 132) is calculated by determining an excess amount of data during the buffer filling phase 102 corresponding to data in excess of an average amount of data that would be downloaded during the same period (the buffer filling phase 102) at a rate corresponding to the average bandwidth usage value 118. In other words, in some examples, the size of the buffer is calculated by multiplying the average bandwidth usage value 118 by the length in time of the buffer filling phase 102 and subtracting the resulting product from the total amount of data actually downloaded during the buffer filling phase 102 (which is directly measured).

In some examples, the above calculations are applied only on the time interval within the buffer filling phase 102 where the measured bandwidth usage exceeds the average bandwidth usage value 118 such that the subtraction of the average bandwidth usage value 118 from the measured bandwidth usage does not produce negative values. In some examples, as described above, there may be a pre-playback sub-phase 114 at the beginning of the buffer filling phase 102 where data is being downloaded before the media starts playing back. As such, the data downloaded during this sub-phase corresponds to data used to fill the buffer rather than the continuous buffering and playing back of media characteristic of the normal streaming phase 104. Accordingly, in some examples, the total amount of data during the pre-playback sub-phase 114 is added to the excess amount of data calculated above to determine a more accurate size of the buffer. In some examples, as shown in the illustrated example, the pre-playback phase 114 is defined to correspond to the period between the start time 108 of the media and the point in time where the bandwidth usage curve 100 crosses the average bandwidth usage value 118 during the rise 110. In some examples, the pre-playback sub-phase 114 is determined to extend for either a lesser or greater period of time than shown in the illustrated example. In other examples, the data downloaded during the pre-playback phase 114 is ignored as negligible.

In some examples, once the size of the buffer is determined, the duration of the buffer emptying phase 106 can be determined. The duration of the buffer emptying phase 106 in some examples corresponds to the time it takes to playback all the media data stored in the buffer as of the transition time 120 to completely empty the buffer. In some examples, a buffer empty time is calculated by dividing the size of the buffer by the rate at which the buffer is emptied. In some examples, the rate at which the buffer is emptied corresponds to the average bandwidth usage rate 118. That is, the average rate at which data is downloaded to the buffer during the normal streaming phase 104 is also a measure of the rate at which data is emptied out of the buffer as the media is played. Thus, dividing the calculated size of the buffer by the average bandwidth usage value 118 provides an estimate of the duration or buffer empty time of the buffer emptying phase 106. Further, by adding the buffer empty time to the ending of the normal streaming phase 102 (e.g., the transition time 120), the end time 128 of the streaming media can be calculated. In this manner, more accurate data concerning the beginning, ending, and duration of particular media presentations can be determined to provide more robust and/or reliable audience measurement data.

Figure 2:
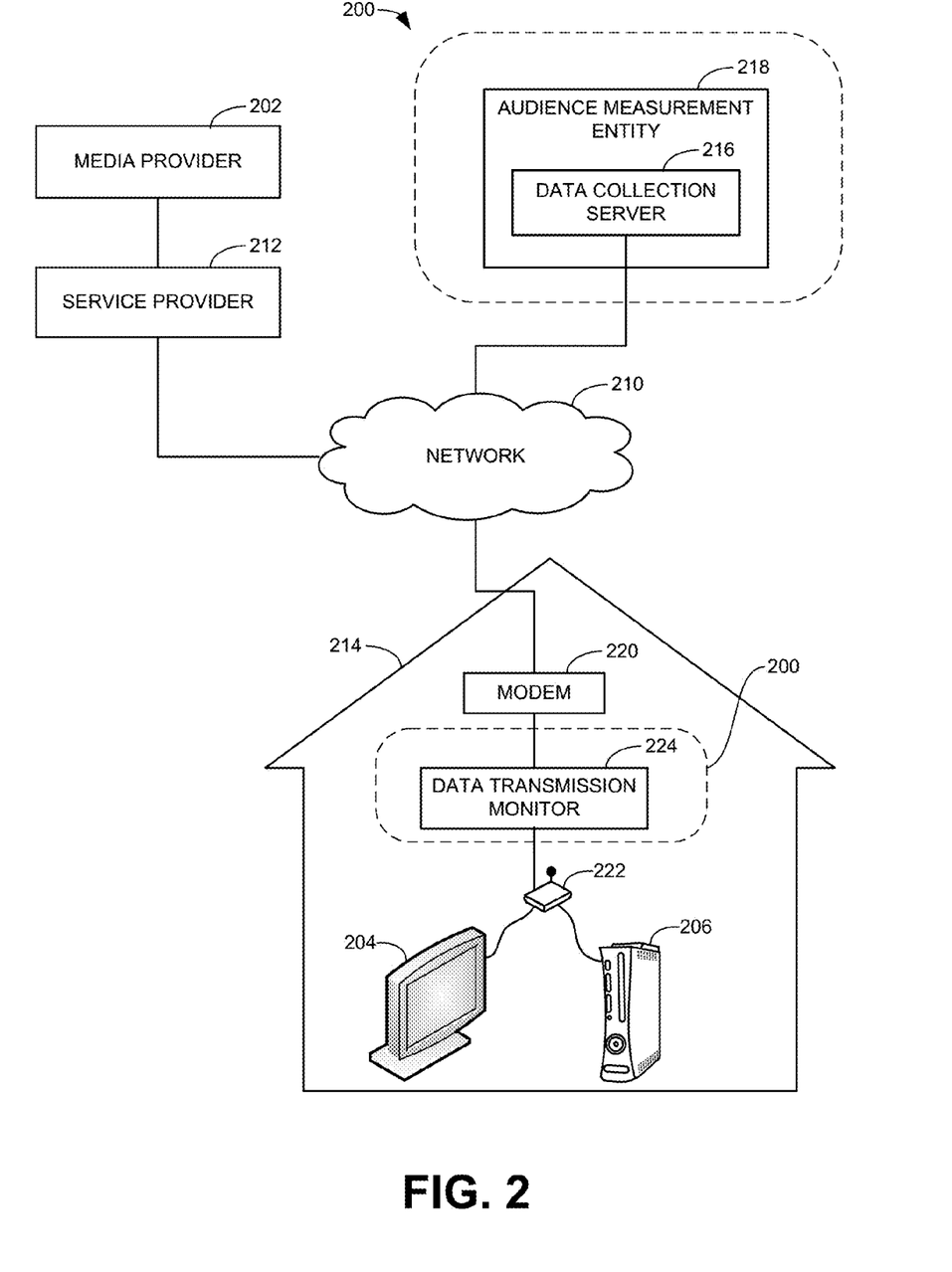
FIG. 2 is a block diagram of an example system constructed in accordance with the teachings disclosed herein to determine an end time of streaming media.

FIG. 2 is a block diagram of an example system 200 constructed in accordance with the teachings of this disclosure to determine an end time of streaming media. The example system 200 of FIG. 2 monitors media provided by an example media provider 202 for presentation on an example media presentation device 204, 206 via an example network 210. FIG. 2 illustrates an example service provider 212, an example media exposure measurement location 214, and an example data collection server 216 of an audience measurement entity 218 (e.g., the Nielsen Company (US) LLC). The example system 200 of FIG. 2 includes the data collection server 216 and a data transmission monitor 224.

The media provider 202 of the illustrated example of FIG. 2 corresponds to any of one or more media provider(s) capable of providing media for presentation via the media device 204, 206. The media provided by the media provider(s) 202 can provide any type(s) of media, such as audio, video, multimedia, etc. The media can correspond to live media, streaming media, broadcast media, stored media, on-demand content, etc.

The service provider 212 of the illustrated example of FIG. 2 provides media services to the media device 204, 206 via, for example, web pages including links (e.g., hyperlinks, embedded media, etc.) to media provided by the media provider 202. The network 210 of the illustrated example is the Internet. Additionally or alternatively, any other network(s) communicatively linking the service provider 212 and the media device 204, 206 such as, for example, a private network, a local area network (LAN), a virtual private network (VPN), etc. may be used. The network 210 may comprise any number of public and/or private networks using any type(s) of networking protocol(s).

In the illustrated example, the media exposure measurement location 214 includes first and second media devices 204, 206. The media exposure measurement location 214 of the illustrated example of FIG. 2 is a panelist household. Panelists are users registered on panels maintained by an audience measurement entity (e.g., the audience measurement entity 218) that owns and/or operates the audience measurement entity subsystem. While the media exposure measurement location 214 is illustrated in FIG. 2 as a panelist household, the media exposure measurement location 214 may be any other location, such as, for example an internet café, an office, an airport, a library, a non-panelist household, etc. While in the illustrated example a single media exposure measurement location 214 is shown, any number and/or type(s) of media exposure measurement locations may be used.

The first and second media devices 204, 206 of the example of FIG. 2 are devices that request media from the service provider 212 for presentation at the media exposure measurement location 214. In some examples, the media devices 204, 206 are capable of directly presenting media (e.g., via a display) while, in some other examples, the media devices 204, 206 present the media on separate media presentation equipment (e.g., speakers, a display, a television, etc.). The first media device 204 of the illustrated example is an Internet enabled television, and thus, is capable of directly presenting media (e.g., via an integrated display and speakers). The second media device 206 of the illustrated example is a gaming console (e.g., Xbox®, PlayStation® 3, etc.) and requires additional media presentation equipment (e.g., a television) to present media. While, in the illustrated example, an Internet enabled television, and a gaming console are shown, any other type(s) and/or number(s) of media device(s) may additionally or alternatively be used. For example, Internet-enabled mobile handsets (e.g., a smartphone), personal desktop computers, laptop computers, tablet computers (e.g., an iPad®), digital media players (e.g., a Roku® media player, a Slingbox®, etc.,) etc. may additionally or alternatively be used. Further, while in the illustrated example two media devices are shown, any number of media devices may be used.

The modem 220 of the illustrated example of FIG. 2 is a modem that enables network communications of the media exposure measurement location 214 to reach the network 210. In some examples, the modem 220 is a digital subscriber line (DSL) modem, while in some other examples the modem 220 is a cable modem. In some examples, the modem 220 is a media converter that converts one type of communications format (e.g., electrical communications, optical communications, wireless communications, etc.) into another type of communications format. In the illustrated example, the modem 220 is separate from a network gateway 222. However, in some examples, the modem 220 is a part of (e.g., integral to) the network gateway 222.

The network gateway 222 of the illustrated example of FIG. 2 is a router that enables the media devices 204, 206 to communicate with the network 210 (e.g., the Internet). In some examples, the example network gateway 222 includes gateway functionality such as modem capabilities. In some other examples, the example network gateway 222 is implemented in two or more devices (e.g., a router, a modem, a switch, a firewall, etc.).

In some examples, the example network gateway 222 hosts a Local Area Network (LAN) for the media exposure measurement location 214. In the illustrated example, the LAN is a wireless local area network (WLAN), and allows the media devices 204, 206 to wirelessly transmit and receive data via the Internet. Alternatively, the network gateway 222 may be wired to such a LAN.

The data transmission monitor 224 of the illustrated example of FIG. 2 is a network device interposed between the LAN hosted by the example network gateway 222 and the network 210. Additionally or alternatively, the data transmission monitor 224 may be a device on the LAN. The data transmission monitor 224 of the illustrated example monitors the transmission of messages or data packets directed from the media devices 204, 206 to the network 210 and/or directed from the network 210 to the media devices 204, 206. In some examples, the monitoring functionality of the data transmission monitor 224 is integrated with the network gateway 222. Additionally or alternatively, in some examples, such monitoring functionality is implemented by each of the media devices 204, 206 individually. In some such examples, where the media device is a mobile device (e.g., a smartphone), an associated data transmission monitor 224 (e.g., installed on the device) may monitor data packets transmitted between the network 210 and the mobile media device when the media device is outside and/or away from the media exposure measurement location 214 (e.g., data transmitted over a cellular telephone network).

In the illustrated example, the data transmission monitor 224 of FIG. 2 creates a record (e.g., a log) of the amount of data communicated from the network 210 to the media devices 204, 206. In some examples, the record generated by the data transmission monitor 224 includes the timing of each data packet received (e.g., via timestamps) to identify the bandwidth usage (e.g., number of packets, data rate, etc.) of the communications at any given point in time. In some examples, the data transmission monitor 224 transmits the record to the data collection server 216 at any desired rate (e.g., continuously, periodically, aperiodically, etc.). In some examples, the data transmission monitor 224 determines which device was involved in the network communications based on an address of the media device (e.g., an IP address, a MAC address, etc.) and communicates such information to the data collection server 216.

In the illustrated example, the data collection server 216 is operated by the audience measurement entity 218 and includes an interface to receive reported bandwidth usage data (e.g., an amount of data transmitted and the corresponding timing of such data transmissions) from the data transmission monitor 224 via the network 210. In the illustrated example, the data collection server 216 includes an HTTP interface to receive HTTP messages that include the bandwidth usage data such as, for example, HTTP requests that are sent with the bandwidth usage data in their payload. Additionally or alternatively, any other method(s) to transfer the bandwidth usage data may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc. In the illustrated example, the data collection server 216 stores and analyzes the extracted bandwidth usage data received from a plurality of different media devices associated with a plurality of different media exposure measurement locations as described more fully below.

Figure 3:
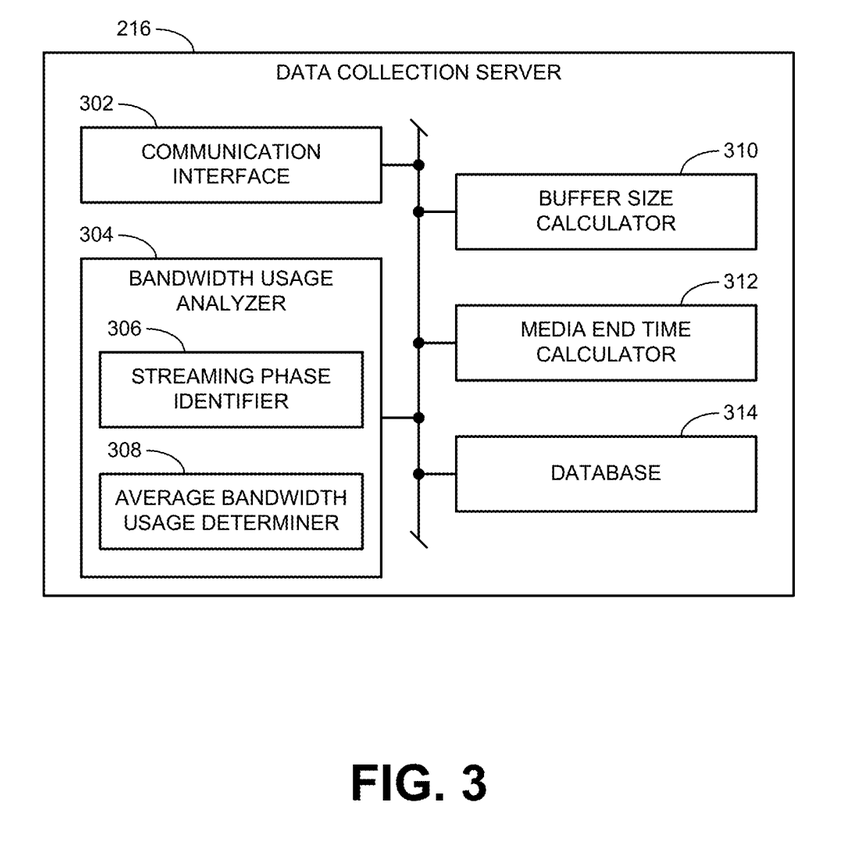
FIG. 3 is a block diagram of an example implementation of the example data collection server of FIG. 2.

FIG. 3 is a block diagram of an example implementation of the example data collection server 216 of FIG. 2. The data collection server 216 of the illustrated example includes an example communication interface 302, an example bandwidth usage analyzer 304 (including an example streaming phase identifier 306 and an example average bandwidth usage determiner 308), an example buffer size calculator 310, an example media end time calculator 312, and an example database 314.

In the illustrated example, the communication interface 302, which may be implemented by a modem or other communication device, serves to communicate with and receive bandwidth usage data from the data transmission monitors 224. In some examples, the received bandwidth usage data is stored on the example database 314.

The example bandwidth usage analyzer 304 of FIG. 3 is implemented by a logic circuit such as a processor executing instructions, but it could additionally or alternatively be implemented by an analog circuit, an ASIC, DSP, FPGA, and/or other circuitry. In some examples, the communication interface 302 and the bandwidth usage analyzer 304 are implemented by the same physical processor. In the illustrated example, the example streaming phase identifier 306 of the example bandwidth usage analyzer 304 analyzes the bandwidth usage data to identify a buffer filling phase (e.g., the buffer filling phase 102 of FIG. 1) and a normal streaming phase (e.g., the normal streaming phase 104 of FIG. 1) associated with streaming media. In some examples, the streaming phase identifier 306 identifies the buffer filling phase 102 by identifying a start time (e.g., the start time 108 of FIG. 1) corresponding to the beginning of the buffer filling phase 102 and a first transition time (e.g., the transition time 124 of FIG. 1) corresponding to the ending of the buffer filling phase 102 and the beginning of the normal streaming phase 104. Further, in some examples, the streaming phase identifier 306 identifies the normal streaming phase 104 based on the first transition time 124 and by identifying a second transition time (e.g., the transition time 120 of FIG. 1) corresponding to the ending of the normal streaming phase 104 and the beginning of a buffer emptying phase (e.g., the buffer emptying phase 106 of FIG. 1).

In some examples, the streaming phase identifier 306 identifies the start time 307 based on an increase or rise (e.g., the rise 110 of FIG. 1) in the bandwidth usage above a baseline bandwidth usage (e.g., the baseline bandwidth usage 112). Streaming media typically involves higher bandwidth usage than most other online activity. Accordingly, in some examples, the streaming phase identifier 306 identifies the start time 307 based on the bandwidth usage exceeding a threshold bandwidth usage above which streaming media can be assumed. Likewise, in some examples, the streaming phase identifier 306 identifies the second transition time 120 (e.g., the ending of the normal streaming phase 104 and the beginning of the buffer emptying phase 106) based on a drop (e.g., the drop 122 of FIG. 1) in the bandwidth usage towards the baseline bandwidth usage 112. In some examples, the second transition time 120 is determined based on the bandwidth usage dropping below a threshold bandwidth usage. Streaming media is unlikely to occur at bandwidth usage levels below the threshold (e.g., below 1 Mbps). There may be circumstances when the bandwidth usage may exceed the threshold used to identify streaming media even when no media is streaming such as, for example, during a software update or the downloading of large data files. In some examples, an audio monitoring system is used to distinguish between streaming media and other high bandwidth usage activities because most media presentations include sound. For example, if the audio monitoring system detects sound beginning soon after the rise 110, the bandwidth usage may be identified as corresponding to streaming media whereas high bandwidth usage that occurs without sound being detected may be disregarded as non-media streaming network activity. In the illustrated example, the streaming phase identifier 306 identifies the first transition time 124 (e.g., between the buffer filling phase 102 and the normal streaming phase 104) based on a drop (e.g., the drop 126 of FIG. 1) in the bandwidth usage following a peak (e.g., the peak 116 of FIG. 1) in the bandwidth usage. In some examples, the precise timing of the first transition time 124 is determined when the bandwidth usage drops below a threshold associated with an average bandwidth usage value (e.g., the average bandwidth usage value 118) corresponding to an average or mean value of the bandwidth usage during the normal streaming phase 104. In the illustrated example, the average bandwidth usage value 118 is determined by the example average bandwidth usage determiner 308. Thus, in some examples, the streaming phase identifier 306 and the average bandwidth usage determiner 308 of the example bandwidth usage analyzer work in tandem to iteratively arrive at a determination for the first transition time 124 and the average bandwidth usage value 118 because each determination depends on the other.

Additionally or alternatively, to reduce the dependence of the streaming phase identifier 306 and the average bandwidth usage determiner 308 on each other, in some examples, the streaming phase identifier 306 identifies the drop 126 and then the average bandwidth usage determiner 308 determines the average of bandwidth usage values beginning a threshold period of time after the identified drop 126 until the second transition time 120 (or until a threshold period of time before the second transition time 120) to calculate the average bandwidth usage value 118. In such examples, the streaming phase identifier 306 then determines a precise time of the first transition time 124 corresponding to when the bandwidth usage drops to the average bandwidth usage value 118 or some other threshold based on the average bandwidth usage value 118 (e.g., 126%, 116%, 95%, etc. of the average bandwidth usage value).

The example buffer size calculator 310 of FIG. 3 is implemented by a logic circuit such as a processor executing instructions, but it could additionally or alternatively be implemented by an analog circuit, an ASIC, DSP, FPGA, and/or other circuitry. In some examples, the communication interface 302, the bandwidth usage analyzer 304, and the buffer size calculator 310 are implemented by the same physical processor. In the illustrated example, the buffer size calculator 310 calculates the size of the buffer associated with the media streaming on the media devices 204, 206. In some examples, the buffer size calculator 310 calculates the size of the buffer by determining an amount of data downloaded during the buffer filling phase 102 in excess of an average amount of data downloaded during the same period of time based on the average bandwidth usage value 118. The buffer size can be conceptualized as the area under the bandwidth usage curve 100 and above the line 130 in FIG. 1 during the buffer filling phase 102 (e.g., the shaded portion 132 of FIG. 1). In some examples, the buffer size calculator 310 also includes the data transmitted during a pre-playback phase (e.g., the pre-playback phase 114 of FIG. 1) regardless of whether the data downloaded is associated with a bandwidth usage above or below the average bandwidth usage value 118.

The example media end time calculator 312 of FIG. 3 is implemented by a logic circuit such as a processor executing instructions, but it could additionally or alternatively be implemented by an analog circuit, an ASIC, DSP, FPGA, and/or other circuitry. In some examples, the communication interface 302, the bandwidth usage analyzer 304, the buffer size calculator 310, and the media end time calculator 312 are implemented by the same physical processor. In the illustrated example, the media end time calculator 312 calculates an end time (e.g., the end time 128 of FIG. 1) of the streaming media (corresponding to an ending of the buffer emptying phase 106). In some examples, the media end time calculator 312 calculates the end time 128 of the streaming media by dividing the calculated buffer size by the average bandwidth usage value 118 to determine a buffer empty time corresponding to a duration of the buffer emptying phase 106. Then the example media end time calculator 312 adds the buffer empty time to the transition time 120 to determine the end time 128 of the streaming media, which may then be stored in the example database 314. In this manner, the data collection server 116 is able to more precisely identify the end time of a particular media presentation to generate more accurate and/or robust reports of the activity or behavior of media audience members (e.g., when they are exposed to media and the duration of such exposure).

While an example manner of implementing the data collection server 216 of FIG. 2 is illustrated in FIG. 3, one or more of the elements, processes and/or devices illustrated in FIG. 3 may be combined, divided, re-arranged, omitted, eliminated and/or implemented in any other way. Further, the example communication interface 302, the example bandwidth usage analyzer 304, the example streaming phase identifier 306, the example average bandwidth usage determiner 308, the example buffer size calculator 310, the example media end time calculator 312, the example database 314, and/or, more generally, the example data collection server 216 of FIG. 3 may be implemented by hardware, software, firmware and/or any combination of hardware, software and/or firmware. Thus, for example, any of the example communication interface 302, the example bandwidth usage analyzer 304, the example streaming phase identifier 306, the example average bandwidth usage determiner 308, the example buffer size calculator 310, the example media end time calculator 312, the example database 314, and/or, more generally, the example data collection server 216 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 302, the example bandwidth usage analyzer 304, the example streaming phase identifier 306, the example average bandwidth usage determiner 308, the example buffer size calculator 310, the example media end time calculator 312, and/or the example database 314 is/are hereby expressly defined to include a tangible computer readable storage device or storage disk such as a memory, a digital versatile disk (DVD), a compact disk (CD), a Blu-ray disk, etc. storing the software and/or firmware. Further still, the example data collection server 216 of FIG. 2 may include one or more elements, processes and/or devices in addition to, or instead of, those illustrated in FIG. 3, and/or may include more than one of any or all of the illustrated elements, processes and devices.

Figure 4:
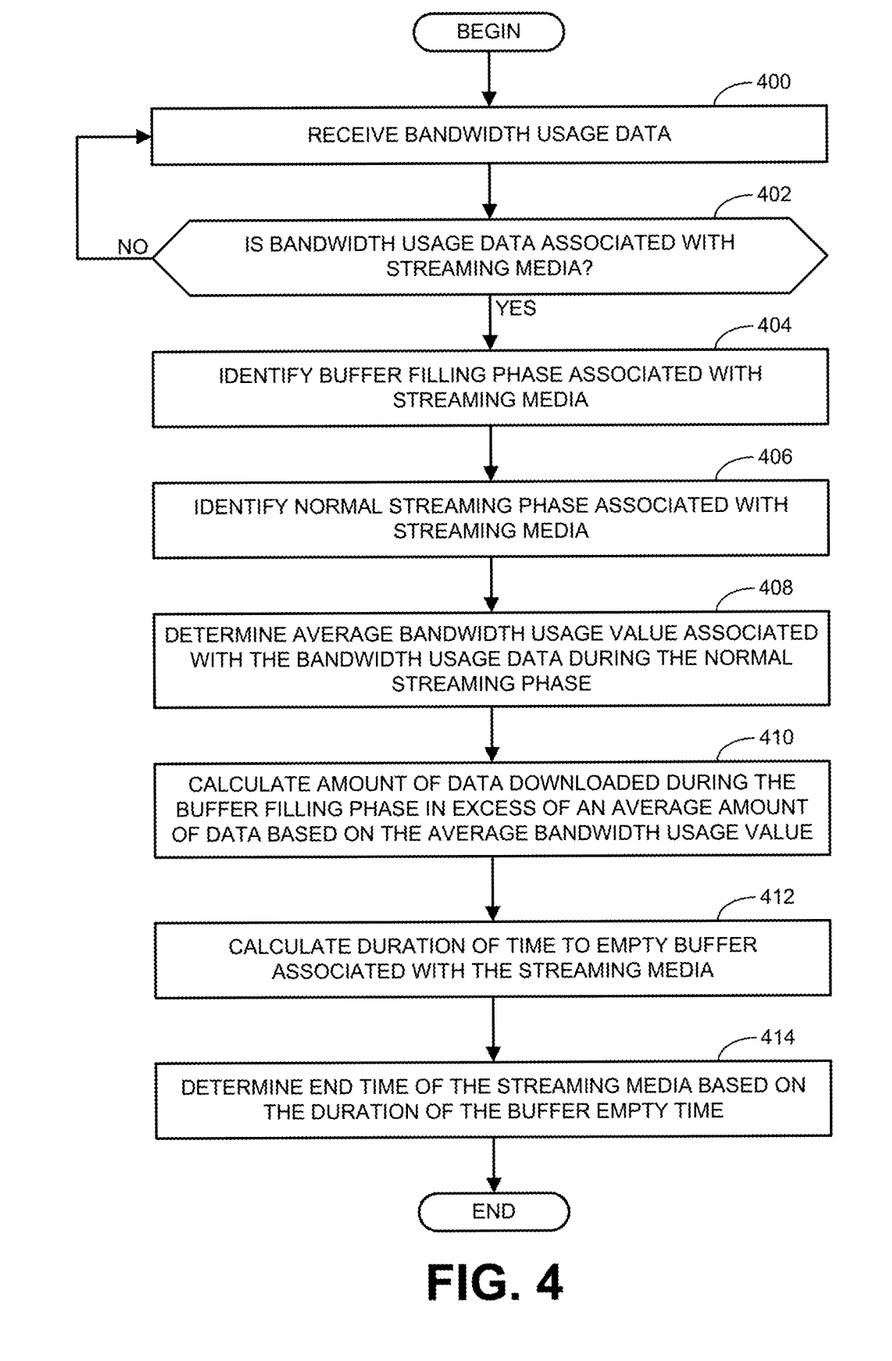
FIG. 4 is a flowchart representative of example machine-readable instructions that may be executed to implement the example data collection server of FIGS. 2 and/or 3.

A flowchart representative of example machine readable instructions for implementing the data collection server 216 of FIG. 3 is shown in FIG. 4. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example data collection server 216 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 4 illustrates processing and analysis of bandwidth usage data collected at a single media exposure measurement location 214 (e.g., a panelist household). Multiple instances of the program of FIG. 4 (e.g., multiple threads) may execute in parallel to process bandwidth usage data from other panelists and/or non-panelist from other media exposure measurement locations. The example program of FIG. 4 begins at block 400 where the example communication interface 302 receives bandwidth usage data. At block 402, the example streaming phase identifier 306 determines whether the bandwidth usage data is associated with streaming media. For example, the streaming phase identifier 306 may compare the bandwidth usage data to a threshold value for the bandwidth usage above which streaming media is likely to be occurring because the bandwidth usage associated with streaming media is typically greater than most other network communications (e.g., merely surfing the Internet). If the example streaming phase identifier 306 determines that the bandwidth usage data is not associated with streaming media (block 402), control returns to block 400 to receive and then analyze subsequent bandwidth usage data.

If the example streaming phase identifier 306 determines that the bandwidth usage data is associated with streaming media (block 402), control advances to block 404 where the example streaming phase identifier 306 identifies a buffer filling phase (e.g., the buffer filling phase 102 of FIG. 1) associated with the streaming media. At block 406, the example streaming phase identifier 306 identifies a normal streaming phase (e.g., the normal streaming phase 104 of FIG. 1) associated with the streaming media. In some examples, the buffer filling phase 102 (identified at block 404) and the normal streaming phase 104 (identified at block 406) are identified based on significant and/or abrupt changes detected in the bandwidth usage data. For example, an initial rise 110 in the bandwidth usage data above a baseline bandwidth usage 112 and/or above the threshold indicative of streaming media may be used to identify a start time 108 of the media corresponding to a beginning of the buffer filling phase 102. A drop 126 in the bandwidth usage data after a peak 116 may be used to identify the timing of a transition time 124 indicative of the end of the buffer filling phase 102 and the beginning of the normal streaming phase 104. Finally, a second drop 122 in the bandwidth usage data towards the baseline bandwidth usage 112 may be used to identify the timing of a second transition time 120 indicative of the end of the normal streaming phase 104 and the beginning of a buffer emptying phase 106.

At block 408, the example average bandwidth usage determiner 308 determines an average bandwidth usage value (e.g., the average bandwidth usage value 118 of FIG. 1) associated with the bandwidth usage data corresponding to the normal streaming phase 104. Thus, in the illustrated example, the average bandwidth usage determiner 308 depends on the identification of the normal streaming phase 104 by the streaming phase identifier 308 (e.g., at block 406) to determine the average bandwidth usage value 118. However, in some examples, the streaming phase identifier 308 depends on the determination of the average bandwidth usage value 118 by the average bandwidth usage determiner 308 (at block 408) to identify the transition time 124 between the buffer filling phase 102 and the normal streaming phase 104. Accordingly, in some examples, the streaming phase identifier 306 and the average bandwidth usage determiner 308 operate in combination to iteratively implement blocks 404, 406, and 408.

At block 410, the example buffer size calculator 310 calculates an amount of data downloaded during the buffer filling phase 102 in excess of an average amount of data based on the average bandwidth usage value 118. In the illustrated example, the calculated excess amount of data corresponds to the size of the buffer associated with the streaming media. At block 412, the example media end time calculator 312 calculates a duration of time to empty the buffer associated with the streaming media. In some examples, this buffer empty time is an estimate of the duration of the buffer emptying phase 106 following the normal streaming phase 104. In some examples, the media end time calculator 312 calculates the buffer empty time by dividing the calculated size of the buffer by the average bandwidth usage value 118. At block 414, the example media end time calculator 312 determines the end time of the streaming media based on the calculated buffer empty time. In some examples, the example media end time calculator 312 determines the end time of the streaming media by adding the buffer empty time (e.g., the duration of time to empty the buffer) to the time corresponding to the second transition time 120 indicative of the beginning of a buffer emptying phase 106.

Figure 5:
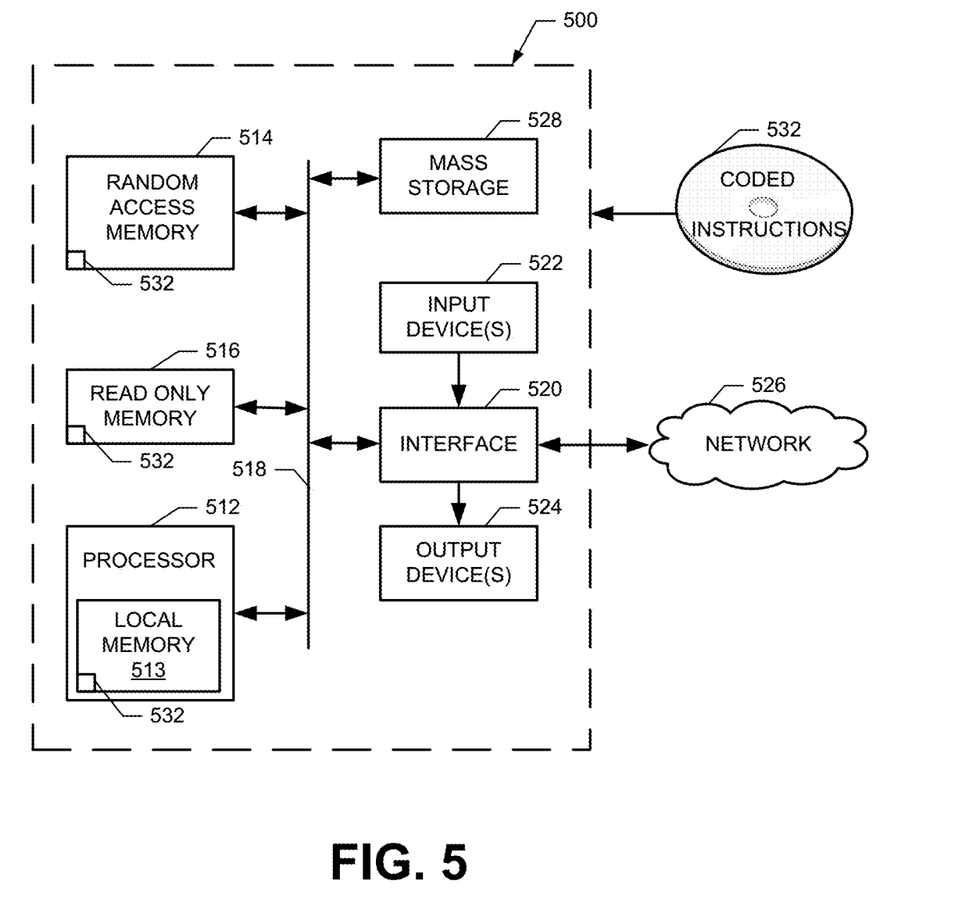
FIG. 5 is a block diagram of an example processor platform capable of executing the example machine-readable instructions of FIG. 4 to implement the example data collection server of FIGS. 2 and/or 3.

FIG. 5 is a block diagram of an example processor platform 1000 capable of executing the instructions of FIG. 4 to implement the data collection server 216 of FIG. 3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
analyzing bandwidth usage data corresponding to bandwidth usage associated with streaming media during a first phase of the streaming of the media and during a second phase of the streaming of the media prior to the first phase wherein an average usage value of the bandwidth usage during the first phase is different than the bandwidth usage during the second phase;
determining a size of a buffer based on the bandwidth usage during the first phase relative to the bandwidth usage during the second phase; and
determining an end time of the media based on the size of the buffer.

2. The method of claim 1, further including calculating the average usage value of the bandwidth usage during the first phase of the streaming of the media.

3. The method of claim 2, further including determining the size of the buffer based on the average usage value and the bandwidth usage during the second phase.

4. The method of claim 3, wherein the second phase corresponds to the streaming of the media before the buffer is filled with a threshold amount of data, the first phase corresponding to the streaming of the media after the buffer is filled with the threshold amount of data and while the media continues to be buffered.

5. The method of claim 3, further including identifying a transition time between the first and second phases based on a drop in the bandwidth usage from a peak toward the average usage value.

6. The method of claim 3, further including:
calculating a buffer empty time based on the size of the buffer and the average usage value, the buffer empty time corresponding to an amount of time to empty the buffer; and
determining the end time of the media by adding the buffer empty time to an end of the first phase.

7. The method of claim 6, further including identifying the end of the first phase based on a drop in the bandwidth usage from the average usage value to a baseline bandwidth usage lower than the average usage value.

8. The method of claim 3, further including:
calculating an average amount of data associated with the bandwidth usage during the second phase based on the average usage value;
calculating an excess amount of data associated with the bandwidth usage during the second phase in excess of the average amount of data; and
determining the size of the buffer based on the excess amount of data.

9. The method of claim 8, further including:
calculating a pre-playback amount of data associated with the bandwidth usage during a pre-playback portion of the second phase, the pre-playback portion of the second phase corresponding to the buffer being filled prior to playing the media; and
determining the size of the buffer based on a sum of the excess amount of data and the pre-playback amount of data.

10. An apparatus comprising:
a logic circuit;
a bandwidth usage analyzer to analyze bandwidth usage data corresponding to bandwidth usage associated with streaming media through a buffer during a first phase of the streaming of the media and during a second phase of the streaming of the media prior to the first phase wherein an average usage value of the bandwidth usage during the first phase is different than the bandwidth usage during the second phase;

a buffer size calculator to determine a size of the buffer based on the bandwidth usage during the first phase relative to the bandwidth usage during the second phase; and an end time calculator to determine an end time of the media based on the size of the buffer, at least one of the bandwidth usage analyzer, the buffer size calculator, or the end time calculator implemented by the logic circuit.

11. The apparatus of claim 10, wherein the bandwidth usage analyzer includes an average bandwidth usage determiner to calculate the average usage value for the bandwidth usage during the first phase of the streaming of the media.

12. The apparatus of claim 11, wherein the buffer size calculator is to determine the size of the buffer based on the average usage value and the bandwidth usage during the second phase.

13. The apparatus of claim 12, wherein the second phase corresponds to the streaming of the media before the buffer is filled with a threshold amount of data, the first phase corresponding to the streaming of the media after the buffer is filled with the threshold amount of data and while the media continues to be buffered.

14. The apparatus of claim 12, wherein the bandwidth usage analyzer includes a phase identifier to identify a transition time between the first and second phases based on a drop in the bandwidth usage from a peak toward the average usage value.

15. The apparatus of claim 12, wherein the end time calculator is to calculate a buffer empty time based on the size of the buffer and the average usage value, the buffer empty time corresponding to an amount of time to empty the buffer, the end time calculator to determine the end time of the media by adding the buffer empty time to an end of the first phase.

16. The apparatus of claim 15, wherein the bandwidth usage analyzer includes a phase identifier to identify the end of the first phase based on a drop in the bandwidth usage from the average usage value to a baseline bandwidth usage lower than the average usage value.

17. The apparatus of claim 12, wherein the buffer size calculator is to:

calculate an average amount of data associated with the bandwidth usage during the second phase based on the average usage value;

calculate an excess amount of data associated with the bandwidth usage during the second phase in excess of the average amount of data; and determine the size of the buffer based on the excess amount of data.

18. The apparatus of claim 17, wherein the buffer size calculator is to:

calculate a pre-playback amount of data associated with the bandwidth usage during a pre-playback portion of the second phase, the pre-playback portion of the second phase corresponding to the buffer being filled prior to playing the media; and determine the size of the buffer based on a sum of the excess amount of data and the pre-playback amount of data.

19. A tangible computer readable storage device comprising instructions that, when executed, cause a machine to at least:

analyze bandwidth usage data corresponding to bandwidth usage associated with streaming media during a first phase of the streaming of the media and during a second phase of the streaming of the media prior to the first phase wherein an average usage value of the bandwidth usage during the first phase is different than the bandwidth usage during the second phase;

determine a size of a buffer based on the bandwidth usage during the first phase relative to the bandwidth usage during the second phase; and determine an end time of the media based on the size of the buffer.

20. The storage device of claim 19, wherein the instructions further cause the machine to calculate the average usage value of the bandwidth usage during the first phase of the streaming of the media.

21. The storage device of claim 20, wherein the instructions further cause the machine to determine the size of the buffer based on the average usage value and the bandwidth usage during the second phase.

22. The storage device of claim 21, wherein the second phase corresponds to the streaming of the media before the buffer is filled with a threshold amount of data, the first phase corresponding to the streaming of the media after the buffer is filled with the threshold amount of data and while the media continues to be buffered.

23. The storage device of claim 21, wherein the instructions further cause the machine to identify a transition time between the first and second phases based on a drop in the bandwidth usage from a peak toward the average usage value.

24. The storage device of claim 21, wherein the instructions further cause the machine to:

calculate a buffer empty time based on the size of the buffer and the average usage value, the buffer empty time corresponding to an amount of time to empty the buffer; and determine the end time of the media by adding the buffer empty time to an end of the first phase.

25. The storage device of claim 24, wherein the instructions further cause the machine to identify the end of the first phase based on a drop in the bandwidth usage from the average usage value to a baseline bandwidth usage lower than the average usage value.

26. The storage device of claim 21, wherein the instructions further cause the machine to:

calculate an average amount of data associated with the bandwidth usage during the second phase based on the average usage value;

calculate an excess amount of data associated with the bandwidth usage during the second phase in excess of the average amount of data; and determine the size of the buffer based on the excess amount of data.

27. The storage device of claim 26, wherein the instructions further cause the machine to:

calculate a pre-playback amount of data associated with the bandwidth usage during a pre-playback portion of the second phase, the pre-playback portion of the second phase corresponding to the buffer being filled prior to playing the media; and determine the size of the buffer based on a sum of the excess amount of data and the pre-playback amount of data.

* * * * *